(12) United States Patent
Tripathi et al.

(10) Patent No.: US 11,484,801 B2
(45) Date of Patent: Nov. 1, 2022

(54) ACTIVITY-FACTORED TEAM FORMATION IN MULTIPLAYER ONLINE GAMING

(71) Applicant: Riot Games, Inc., Los Angeles, CA (US)

(72) Inventors: Rahul Tripathi, Chesterfield, MO (US); Jonathan Blair Moormann, Valley Glen, CA (US); Tomasz Mozolewski, Dardenne Prairie, MO (US); Jordan Braman Checkman, Los Angeles, CA (US); Cody Bryant Germain, Los Angeles, CA (US); Lawrence Lihuan Xie, Los Angeles, CA (US); Wenbin Xiang, Stevenson Ranch, CA (US)

(73) Assignee: Riot Games, Inc., Los Angeles, CA (US)

( * ) Notice: Subject to any disclaimer, the term of this patent is extended or adjusted under 35 U.S.C. 154(b) by 3 days.

(21) Appl. No.: 17/210,312

(22) Filed: Mar. 23, 2021

(65) Prior Publication Data
US 2022/0305390 A1 Sep. 29, 2022

(51) Int. Cl.
A63F 13/795 (2014.01)
A63F 13/35 (2014.01)

(52) U.S. Cl.
CPC ............ *A63F 13/795* (2014.09); *A63F 13/35* (2014.09)

(58) Field of Classification Search
CPC ............................... A63F 13/795; A63F 13/35
USPC ......................................................... 463/42
See application file for complete search history.

(56) References Cited

U.S. PATENT DOCUMENTS

| | | | |
|---|---|---|---|
| 9,795,887 B2 | 10/2017 | Lin et al. | |
| 10,322,351 B2 | 6/2019 | Marr et al. | |
| 10,610,786 B2 | 4/2020 | Aghdaie et al. | |
| 10,997,494 B1* | 5/2021 | Ng | G06Q 30/0201 |
| 2003/0073471 A1* | 4/2003 | Varley | A63F 13/27 463/1 |
| 2007/0173325 A1 | 7/2007 | Shaw et al. | |
| 2007/0191102 A1 | 8/2007 | Coliz et al. | |
| 2008/0071580 A1* | 3/2008 | Marcus | G16H 40/67 705/3 |
| 2010/0009657 A1* | 1/2010 | Dingler | H04W 12/02 455/411 |
| 2014/0025732 A1* | 1/2014 | Lin | H04L 67/306 709/204 |

(Continued)

*Primary Examiner* — Michael A Cuff
(74) *Attorney, Agent, or Firm* — Shook, Hardy & Bacon LLP

(57) ABSTRACT

In various examples, the present system tracks gameplay timeframes for when a user is engaged in an instance of gameplay. The system can then determine one or more typical timeframe(s) for when the user engages in gameplay. In some embodiments, the user can access a team matching UI and request to be matched with other user accounts and/or to be presented with a list of other user accounts who might be a good match for the user, such as those associated with similar typical timeframes for gameplay. Based on the request from the user, a set of user accounts available to be matched can be ranked based, at least in part, on a similarity between gameplay timeframes associated with the user and each of the user accounts in the set of user accounts. Using the ranking, the system can generate a team of users with similar typical gameplay timeframes.

20 Claims, 5 Drawing Sheets

(56) References Cited

U.S. PATENT DOCUMENTS

| | | | |
|---|---|---|---|
| 2014/0194199 A1* | 7/2014 | DiGiovanni | G07F 17/3241 |
| | | | 463/29 |
| 2015/0038226 A1* | 2/2015 | Maeda | A63F 13/35 |
| | | | 463/31 |
| 2016/0110789 A1* | 4/2016 | Gilb | G06Q 30/0282 |
| | | | 705/26.44 |
| 2016/0247119 A1* | 8/2016 | Goates | G06Q 10/1053 |
| 2017/0109390 A1* | 4/2017 | Bradley | G06F 16/335 |
| 2018/0185756 A1* | 7/2018 | Webb | A63F 13/85 |
| 2018/0336764 A1* | 11/2018 | Lark | G07F 17/323 |
| 2020/0086217 A1* | 3/2020 | Trombetta | A63F 13/497 |
| 2020/0324208 A1* | 10/2020 | Cleven | A63F 13/35 |
| 2021/0283510 A1* | 9/2021 | Reeves | A63F 13/798 |

\* cited by examiner

FIG. 2B

ACTIVITY-FACTORED TEAM FORMATION IN MULTIPLAYER ONLINE GAMING

BACKGROUND

Users of mobile video games—such as a multiplayer online battle arena ("MOBA")—often form or join teams to practice for and/or compete in team-based tournament games. For example, a user playing a MOBA game, such as League of Legends®, may create a team and add the team to a team-finding network. Additional users can then discover the team and request to join.

However, in some conventional systems, it can be difficult for users to decide which team to join due to a large quantity of teams and a lack of information available regarding those teams on team-finding networks. For example, a user searching for a team to join using conventional systems might be presented with a large list of teams, but might not be presented with enough information about the players to be able to meaningfully distinguish between teams. In such instances, users often simply select a team at the top of the list, hoping for the best. However, users grouped into teams using these conventional systems often have different schedules and typical gameplay timeframes making it difficult to coordinate a time of day to practice for and/or play in team-based tournament games. As a result, scheduling difficulties can cause teams to disband, requiring the users to try to find a new team with players whose schedules might better align. Moreover, team-based tournament games can be a stressful experience for users. Users often prefer to practice with other members of the team and prefer to be on a team with players who will approach tournament-based games in a serious manner. If a player on the team does not play with competitive integrity, the team may lose the tournament and other members of the team can have a negative experience.

SUMMARY

Embodiments of the present disclosure relate to multiplayer online gaming team formation techniques. Systems and methods are disclosed that rank and match user accounts based on a similarity of tracked user attributes, such as gameplay timeframes, among other things.

In contrast to conventional systems, such as those described above, the present system can track gameplay timeframes for when a user is engaged in one or more instances of gameplay, such as the timeframe(s) of the user's League of Legends® gameplay session(s). For example, a timeframe associated with each instance of gameplay a user engages in—whether the user is playing a single match, a tournament, or otherwise—can be tracked and stored into a user profile associated with the user. The system can then determine one or more typical timeframe(s) for when the user engages in gameplay, or in other words, is actively participating in a gameplay session of a video game. For example, the system can determine that the user generally plays video games on Wednesday evenings. In some embodiments, the user can access a team matching user interface (UI) and request to be matched with other user accounts and/or to be presented with a list of the other user accounts who might be a good match for the user, such as those associated with similar typical timeframes for gameplay. Based on the request from the user, a set of user accounts available to be matched into a team can be ranked based, at least in part, on a similarity between gameplay timeframes associated with the user and each of the user accounts in the set of user accounts. Using the ranking, the system can generate a team of users with similar typical gameplay timeframes. For example, the system can group the user into a team with other user accounts that typically engage in gameplay on Wednesday evenings. Advantageously, the system enables users with similar typical gameplay timeframes to be grouped together based on each user's tracked gameplay timeframes, which was not possible in conventional systems.

BRIEF DESCRIPTION OF THE DRAWINGS

The present systems and methods for online multiplayer team formation are described in detail below with reference to the attached drawing figures, wherein:

FIGS. 2A-2B are illustrations that depict example team match interfaces, in accordance with some embodiments of the present disclosure;

DETAILED DESCRIPTION

Figure 1:
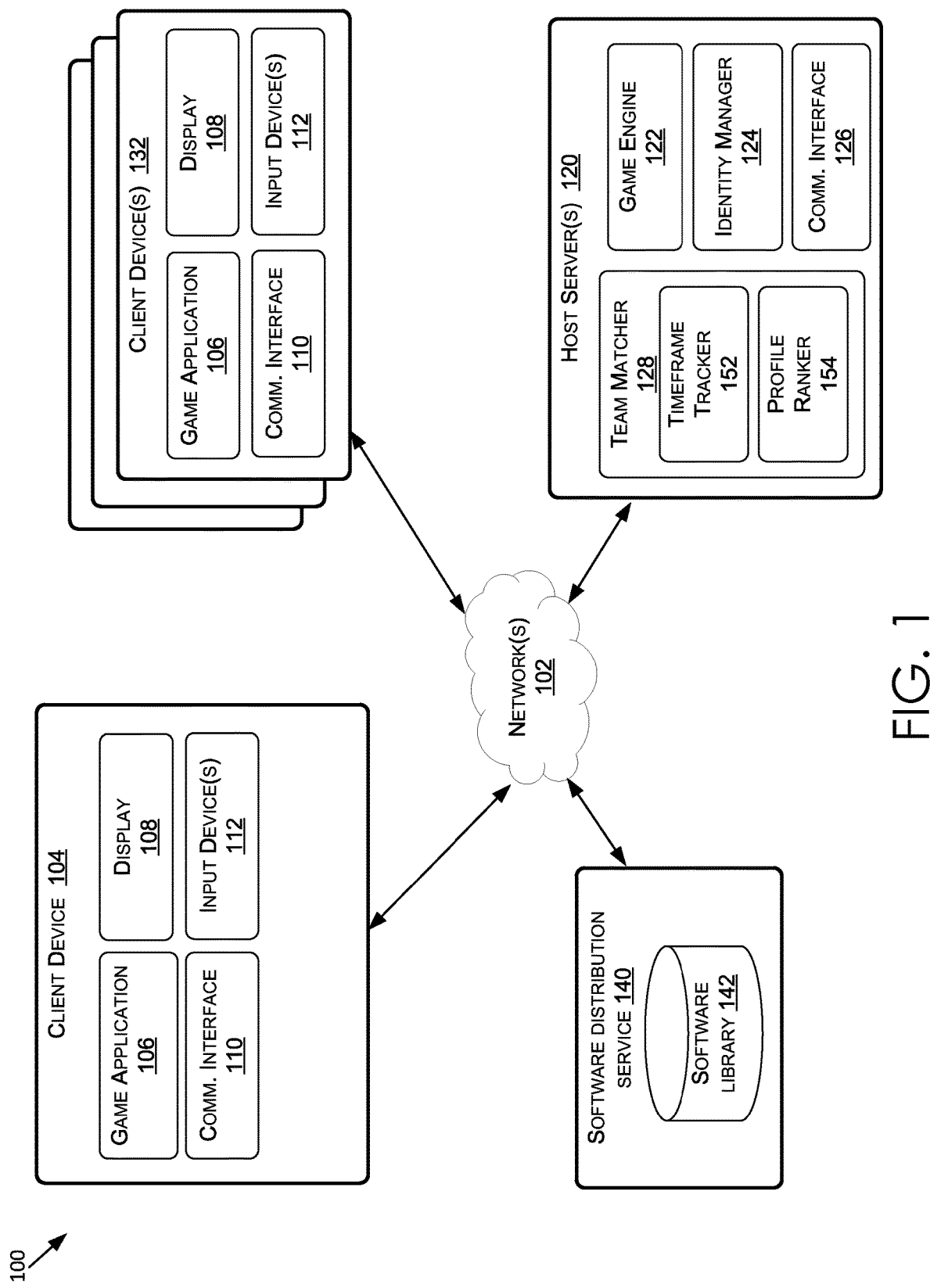
FIG. 1 is an example system diagram of a team matching system, in accordance with some embodiments of the present disclosure.

Systems and methods are disclosed relating to online multiplayer team formation techniques. Although primarily described herein with respect to gaming implementations for League of Legends® Clash tournaments, this is not intended to be limiting, and the systems and methods of the present disclosure can be implemented in any implementation for forming online teams and/or grouping users of an online community together. For non-limiting examples, the systems and methods described herein can be implemented for simulation applications, video conferencing applications, collaboration applications, and/or other online multiuser applications.

In some embodiments, the present system can track a set of timeframes for when a user is engaged in an instance of gameplay (i.e., gameplay timeframes), such as playing League of Legends®. In some embodiments, a user can be determined to be engaged in an instance of gameplay whenever the user interacts with a game. The user can be determined to interact with the game when a client device of the user is communicatively coupled to a server (e.g., host server, gaming server) associated with a game. For example, a timeframe during which a user is connected to a game server can be considered a gameplay timeframe. Additionally or alternatively, timeframes during which a user is taking part in a tournament gaming session and/or a free-play gaming session (e.g., non-tournament gaming session) can be considered a gameplay timeframe. Each instance of gameplay can be tracked and stored in a memory, such as a database. For example, a gameplay timeframe for a user engaged in an instance of gameplay of a League of Legends® game mode—such as 'Summoner's Rift', 'All Random All Mid (ARAM)', and 'Teamfight Tactics'—that is not included as part of a scheduled tournament, can be tracked and included in the tracked set of timeframes. Likewise, a gameplay timeframe for a user engaged in an instance of gameplay of a League of Legends® Clash tournament can be tracked an included in the tracked set of timeframes.

Tracked gameplay timeframes can be stored in association with a user profile associated with the user and/or user account. In some embodiments, a set of gameplay timeframes associated with a user account and/or user profile can be stored in an identity management system (IDM) that can be stored on host servers. For example, identity management information (e.g., gameplay timeframes, username, game progress, avatar, Champion, honor progress, etc.) corresponding to a particular game application can be managed by a game developer or host of the game application.

In some embodiments, using the tracked gameplay timeframes, the system can then determine a typical gameplay timeframe for when the user engages in gameplay. To determine a typical gameplay timeframe for a particular user, the system may access and analyze a set of tracked timeframes for when a user was engaged in an instance of gameplay. The set of tracked gameplay timeframes can be analyzed to determine patterns, characteristics, and/or models associated with one or more tracked gameplay timeframe corresponding to one or more instance(s) of gameplay of the set of tracked timeframes. In some embodiments, the system may determine/extract gameplay timeframe features associated with the set of tracked timeframes as well as individual timeframes, such as dates (e.g., distinguishing between weekdays and weekends), times of day, length of play, holiday (e.g., domestic, international, regional, etc.), frequency of gameplay, days between instances of gameplay, and number of consecutive days played/missed. These gameplay timeframe features can then be used to determine one or more typical gameplay timeframes and duration for when the user engages in gameplay. For example, the system can determine that the user generally plays video games on Wednesday evenings for three hours between the hours of 5:00 PM and 11:00 PM. In some embodiments, a weight can be applied to the extracted gameplay timeframe features to calculate one or more typical gameplay timeframes for when the user engages in gameplay. Further, the typical timeframes for when the user engages in gameplay can be updated as the user engages in additional instances of gameplay, generating a more accurate model of the user's typical gameplay timeframes and/or adjusting for the user's change in typical gameplay timeframes.

In some embodiments, the user can request for their user account to be matched with other user accounts and/or to be presented with a list of the other user accounts who might be a good match for the user, such as those associated with similar typical gameplay timeframes. As used herein, "similar" can refer to a general likeness (e.g., within a percentage difference, below a threshold difference, within a difference range) of tracked gameplay timeframes, geographic region (s), and/or other player attributes associated with the plurality of user accounts. In some embodiments, a degree of similarity may be a measurable metric associated with two or more user accounts. The degree of similarity for gameplay timeframes for two user accounts can be a time difference measurement (e.g., hours, minutes, days, etc.) between a first player's typical gameplay timeframe and a second player's typical gameplay timeframe. The degree of similarity for geographic region may be a distance measurement (e.g., miles, kilometers, travel time) between a first player's location (e.g., address, city, state, zip code, country, time zone) and a second player's location. In some embodiments, the degree of similarity for various attributes associated with a user account (e.g., gameplay timeframes, geographic region(s), and/or other player attributes) can each be weighted differently, either by a developer or by a user.

Users can access a UI for finding other user accounts. For example, a user can access a UI for matching users to request to be matched with other user accounts. The UI can be associated with a particular game, can be a stand-alone application for matching users, and/or can be associated with a particular mode of a particular game, such as the League of Legends® tournament mode, "Clash". In some embodiments, the user can submit a request (e.g., via the UI) to form a team for tournament gameplay (e.g., in association with a tournament-play mode of an online game/application). For example, a user may know of an upcoming scheduled (e.g., date, time, etc.) League of Legends® Clash tournament. The user can then access the UI to submit a request to be matched with other user accounts. Based on the request, the user can be grouped into a team for the upcoming Clash tournament. Tournament gameplay can include a series of contests between a number of competitors who can compete for an overall prize.

Utilizing a similarity of tracked gameplay timeframes, a user (i.e., a user account) can be automatically matched with a set of user accounts to form a team. Alternatively, the user can be presented with a list of matched user accounts. In some embodiments, based on receiving the request from the user to be matched with other user accounts and/or to be presented with a list of the other user accounts who might be a good match for the user, a set of user accounts can be ranked based on, among other things, a similarity between tracked gameplay timeframes associated with the user and each of the user accounts in the set of user accounts. For example, if a user who typically plays video games on Wednesday evenings requests to be matched with other users (i.e., other user accounts) to form a team, the system can access a set of user accounts available to be matched with the user and rank the set of user accounts based on the typical timeframe for gameplay associated with each of the user accounts in the set—ranking those who also play video games on Wednesday evenings higher than those who do not play or play as regularly on Wednesday evenings. In this example, user accounts that typically (e.g., more often than other days/times) play video games on Wednesday evenings might be given a high similarity ranking, those that occasionally play video games on Wednesday evenings might be given a medium similarity ranking (e.g., varying in granularity depending on frequency), and those that never play video games on Wednesday evenings might be given a low similarity ranking. Advantageously, using these rankings, each user account in the set can be ranked by their similarity to the user account that submitted the request to be matched with other user accounts. While the example above discusses a single typical gameplay timeframe, the system can determine multiple typical gameplay timeframes and, using multiple gameplay timeframes, match users by weighing one or more typical gameplay timeframes for each of the users to determine gameplay timeframe similarities.

In some embodiments, user accounts can be automatically or selectively ranked based further on a similarity of geographical region. For example, a user who is geographically located (e.g., based on an IP address, most frequently used IP address, and/or user profile defined location) in Seattle, Wash. can request to rank user accounts to be presented with a list of the other user accounts that are also located in Seattle, Wash. User accounts might then be ranked based on proximity to Seattle, Wash., with user accounts closest to the user being ranked high and user accounts furthest from the user being ranked low.

In further embodiments, user accounts can be ranked based further on player attributes associated with a user account, such as player skill level, social connections, previous gameplay experiences with the user account, and/or position preference. For example, a user account associated with a social media connection (e.g., Facebook, Twitter, Steam, Google Play Games, Game Center, etc.) of the user might be ranked higher than a user account that is not associated with a social media connection. Further, users with skill level similar to the user might be ranked higher. Additionally, users that have won gameplay matches while on the same team can be prioritized over other users (e.g., receive a higher ranking). In some embodiments, following a win as teammates, users can be provided with an indication (e.g., pop-up message, in-game message, email, or the like) that the former teammates might be a good team match.

In some embodiments, the system can generate a team that includes the user account that requested to be matched with other user accounts and a set of user accounts selected from a plurality of user accounts based on the determined rankings. For example, a gameplay tournament may require five participants per team and, as such, the system can generate a team that includes the user that initiated a team generation request as well as four other user accounts that are enrolled for the gameplay tournament and are also ranked highest based on selected attributes (e.g., highest degree of similarity of typical gameplay timeframe). Each of the user accounts included in the generated team can then be given the option to accept/decline the generated team. For example, the user accounts can be grouped together in a team for a scheduled gameplay tournament (e.g., League of Legends® Clash). Based on the user accounts being grouped together, the user accounts can be placed into a chat room, messaging group and/or other online messaging platform to discuss the scheduled gameplay tournament. Upon discussing the tournament, the users associated with the user accounts might determine that one or more of the users may be unavailable for the tournament and/or practice sessions leading up to the tournament. Users included in the team might then be able to leave the generated team or vote to remove one or more of the user accounts from the team.

Once each of the user accounts grouped together into the generated team have accepted to be joined together as a team, the users can select or the system can automatically schedule/suggest a set of tournament gameplay sessions for the team. In some embodiments, the sessions can be scheduled based on the one or more tracked gameplay timeframes associated with the user accounts. For example, the user accounts might have been grouped together into a team based on each of the user accounts being associated with a typical timeframe for gameplay on Wednesday evenings. Based on this typical gameplay timeframe, the system can schedule tournament gameplay sessions for Wednesday evenings. Advantageously, by scheduling the tournament gameplay sessions based on a typical gameplay timeframe associated with each of the user accounts on the team, there is a higher likelihood that all of the members of the team will be available to participate in each of the tournament gameplay sessions, which can eliminate the need for the system to utilize computational resources to analyze and find substitute players for one or more teams prior to the start of a scheduled tournament.

With reference to FIG. 1, FIG. 1 is system diagram that depicts a team matching system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by entities can be carried out by hardware, firmware, and/or software, or any combination thereof. For instance, various functions can be carried out by a processor executing instructions stored in memory. The team matching system 100 (and the components, features, and/or functionality thereof) can be implemented using one or more computing devices, such as example computing device 400 of FIG. 4, described in more detail below.

The team matching system 100 can include, among other things, client device 104, one or more host server(s) 120, client device(s) 132 and/or a software distribution service 140. Components of the team matching system 100 can communicate over network(s) 102. The network(s) can include a wide area network (WAN) (e.g., the Internet, a public switched telephone network (PSTN), a cellular network, etc.), a local area network (LAN) (e.g., Wi-Fi, Bluetooth, Bluetooth Low Energy (BLE), Ethernet, etc.), and/or another network type, such as those described herein. In any example, each of the components of the team matching system 100 can communicate with one or more of the other components via one or more of the network(s) 102.

As illustrated in FIG. 1, the host server(s) 120 can be separate or distinct from the software distribution service 140; however, this is not intended to be limiting. In some examples, the host server(s) 120 can be the same or similar servers to the software distribution service 140. In some examples, the host server(s) 120 can be operated or hosted by a first entity (e.g., a first company) and the software distribution service 140 can be operated or hosted by a second entity (e.g., a second, different company). In other examples, the host server(s) 120 and the software distribution service 140 can be operated and/or hosted by the same entity.

The host server(s) 120 can include one or more application programming interfaces (APIs) to enable communication of information (e.g., user profiles, game state data, etc.) with the client device 104 and the client device(s) 132. The host server(s) 120 can include a game engine 122, identity management component 124, a communication interface 126 and a team matching component 128.

In some embodiments, such as where the host server(s) 120 include an identity manager, the host server(s) 120 can correspond to an identity management (IDM) system. Although illustrated as a component of the host server(s) 120, this is not intended to be limiting. In some embodiments, the identity management component 124 can be hosted by a different server, such as an IDM server (not shown). For example, identity management information corresponding to a particular game application can be managed by a game developer of the game application. In such examples, the identity management component 124 can be hosted by one or more servers or other computing devices of the game developer.

The identity management component 124 can manage and store game information for a user including, but not limited to, digitally stored information about game settings, player or avatar customizations, progress and achievements in the game, state information (e.g., inventory, health, game physics, avatar locations, etc.) of a current game session (e.g., a current sports game, a current capture the flag game, etc.), etc. For example, as a user advances through levels in the game application 106, the user's progress in the game can be stored in association with the user's identity (e.g., user account, username, gamer tag, etc.) in the identity management component 124. Further, team matching system 100 can track a set of timeframes associated with a time and date that a user is engaged in an instance of gameplay, such as playing League of Legends®. These timeframes can be stored in the identity management component 124.

The game engine 122 can include the functionality of a game that enables a game to be played by one or more users over a network. The game engine 122 can include a rendering engine, an audio engine, a physics engine, an animation engine, an artificial intelligence engine, a networking engine, a streaming engine, a memory management engine, and/or other components or features. The game engine 122 can be used to generate some or all game data while a user plays an instance of a game via, or in conjunction with, host server(s) 120.

The communication interface 126 can include one or more components (e.g., network adapter, wireless adapter) and features for communicating across one or more networks, such as the network(s) 102. The communication interface 126 can be configured to communicate via any number of network(s) 102, described herein. For example, to communicate in the team matching system 100 of FIG. 1, the host server(s) 120 can communicate over a LAN with other host server(s) 120 and/or over the Internet with the software distribution service 140, the client device 104 and/or the client device(s) 132.

The team matching component 128 can include a timeframe tracking component 152 and a profile ranking component 154. The timeframe tracking component 152 can track timeframes corresponding to timestamps associated with instances of gameplay. For example, anytime client device 104 and/or client device(s) 132 connect to host server(s) 120, the timeframe tracking component 152 can track dates, times and durations of instances of gameplay. In some embodiments, the timeframe tracking component 152 can record timestamps based on when a user logs in/out of an application, when activity (e.g., network activity) is detected/ends, when an instance of gameplay begins/ends, when an instance of gameplay exceeds a threshold amount of time, when a user begins/ends a chat room discussion, when a user begins/ends modifying an avatar, when a user begins/ends a practice instance/session of gameplay, when a user begins/ends a competitive instance/session of gameplay, when a user begins/ends browsing an online store and/or other events associated with gameplay. In some embodiments, the timeframe tracking component 152 can process the recorded timestamps to determine timeframes and/or distinguish between various types of gameplay. For example, various types of gameplay can include playing a game, customizing an avatar, browsing an online store, communicating with other user accounts in a chat and/or video application, waiting on standby in a waiting room for other users to join an instance of gameplay and/or viewing a previous instance of gameplay (e.g., via Twitch). The timeframes associated with instances of gameplay and various types of gameplay can then be stored in the identity management component 124 in association with a user account.

The profile ranking component 154 can rank a plurality of user accounts based, at least in part, on a similarity of tracked gameplay timeframes, geographic region, and/or other player attributes associated with the plurality of user accounts. For example, the profile ranking component 154 can receive a request from a user via client device 104 to be matched with other user accounts and/or be presented with a list of other user accounts who might be a good match for the user. Based on the request, the profile ranker may access a set of tracked gameplay timeframes associated with the user (e.g., stored in identity management component 124) to determine one or more typical timeframes for when the user engages in gameplay. For example, the profile ranking component 154 can analyze the tracked timeframes to determine patterns, characteristics, and/or models associated with each tracked timeframe corresponding to an instance of gameplay of the set of tracked gameplay timeframes. The profile ranking component 154 can then access a set of other user accounts available (e.g., availability can be indicated via an opt in/out setting of each user account) to be matched with the user as well as one or more typical timeframes for when each of the user accounts engages in gameplay.

The profile ranking component 154 can then rank the set of other user accounts based, at least in part, on a similarity between tracked gameplay timeframes associated with the user and each of the user accounts in the set of other user accounts. For example, if a user who typically plays video games on Wednesday evenings requests to be matched, the profile ranker 152 can access a set of user accounts available to be matched with the user and rank the set of user accounts based on one or more typical timeframes for gameplay associated with each of the user accounts in the set, ranking those who also play video games on Wednesday evenings higher than those who do not play on Wednesday evenings. In this example, user accounts that typically (e.g., more often than other days/times) play video games on Wednesday evenings might be given a high similarity ranking, those that occasionally play video games on Wednesday evenings might be given a medium similarity ranking (e.g., varying in granularity depending on frequency), and those that never play video games on Wednesday evenings might be given a low similarity ranking.

The team matching component 128 can generate a team that includes the user account associated with client device 104—that requested to be matched with other user accounts—and a set of user accounts associated with client device(s) 132. The generated team can be displayed to the user via the display 108 on client device 104 to allow the user to review the set of user accounts that were matched to the user. Each of the user accounts included in the generated team can then be provided with an indication via client device 104 and client device(s) 132 that a team has been generated that includes their user account and be given the option to accept/decline the generated team. For example, a user on client device 104 can review the other user accounts grouped into the team and determine that one or more of the user accounts will not be a good fit for the team and/or scheduled tournament gameplay.

Once each of the user accounts grouped together into the generated team have accepted to be joined together as a team, the team matching component 128 can access a tournament schedule (e.g., stored in association with game engine 122) to schedule a set of tournament gameplay sessions for the team. In some embodiments, the sessions can be scheduled based on the one or more tracked gameplay timeframes associated with the user accounts. For example, the user accounts might have been grouped together into a team based on each of the user accounts being associated with a typical timeframe for gameplay on Wednesday evenings. Based on this typical timeframe, the system can schedule tournament gameplay sessions for Wednesday evenings.

In other embodiments, the team matching component 128 can provide the user a ranked list of other user accounts to allow the user to individually select other user accounts the user would like to invite to the user's team. For example, the team matching component 128 can populate a list of other user accounts and place user accounts with the highest similarity of typical gameplay timeframes to the user at the top of the list, as shown and discussed further in FIG. 2B.

The software distribution service 140 can manage the license (e.g., purchase, rental, lease, and/or loan) of video games or other software applications to a user. The software distribution service 140 can include a digital storefront, platform, or application through which users can acquire a license to video games or applications. The software distribution service 140 can also provide digital rights management (DRM) systems, limiting the use of software to one license per user account, for example.

The software distribution service 140 can further include a software library 142 that stores data files of software and provides access to these files. For example, a user can access the software library 142 via a mobile application store application via client device 104, which can include a catalog of available games or applications the user can purchase or access. The user can browse and/or search the catalog (e.g., via an API) and select a game or application they would like to purchase or access. Upon selection of a game, the user can purchase, lease, rent, or otherwise access the game via the mobile application store application of the software distribution service 140 and the game or application can begin downloading to the client device 104 from the software library 142.

The client device 104 and the client device(s) 132 can include a smart phone, a laptop computer, a tablet computer, a desktop computer, a wearable device, a game console, a virtual reality (VR) or augmented reality (AR) system (e.g., a headset, a computer, a game console, remote(s), controller(s), and/or other components), a content streaming device a smart-home device that can include an intelligent personal assistant, and/or another type of device capable of supporting game play.

The client devices 104 and the client device(s) 132 can include a game application 106, a display 108, a communication interface 110, and/or an input device(s) 112. Although only a few components and/or features of the client device 104 are illustrated in FIG. 1, this is not intended to be limiting. For example, the client devices 104 and the client device(s) 132 can include additional or alternative components, such as those described below with respect to the computing device 400 of FIG. 4.

The game application 106 can be a mobile application, a computer application, a console application, and/or another type of application. The game application 106 can include instructions that, when executed by a processor(s), cause the processor(s) to, without limitation, receive input data representative of user inputs to the one or more input device(s) 112, store game data to the host server(s) 120 and/or the servers on the software distribution service 140 and/or the client device 104, retrieve game data from memory or local storage, receive the game data using the communication interface 110 from the host server(s) 120 and/or the servers on the software distribution service 140 and/or the client device 104, and cause display of the game on the display 108. In other words, the game application 106 can operate as a facilitator for enabling playing of a game associated with the game application on the client devices 104 and the client device(s) 132.

The game application 106 can be purchased (e.g., for a monetary value or for free) by a user from a software library 142 of the software distribution service 140. In any example, upon purchasing the game application 106, data files of the game application 106 can begin downloading to the client device 104. The game application 106 and/or patches or updates to the game application 106 can be downloaded from the software distribution service 140 or can be downloaded from another server(s), such as a server of a content delivery network (CDN). For example, the software distribution service 140 can be located in a different country or on a different continent, so to reduce the download time, the game application 106 and/or the patches or updates can be stored on different servers around the globe. As such, when the client devices 104 are downloading the game application 106 and/or the patches or updates, the client devices 104 can connect to a more local server that is part of the CDN, for example.

In some examples, such as where a local instance of a game is being executed, the client devices 104 can render the game using the game application 106 and hardware and/or software of the client device 104. In other examples, such as where the cloud-hosted instance of the game is being executed, the client device 104 can receive display data (e.g., encoded display data) and use the display data to display the game on the display 108. In examples where the display data is received by the client device (e.g., where the client device 104 does not generate the rendering), the team matching system 100 can be part of a game streaming system.

The display 108 can include any type of display capable of displaying the game (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 can include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104 and the client device(s) 132.

The input device(s) 112 can include any type of devices that are capable of providing user inputs to the game. The input device(s) can further include a keyboard, a mouse, a controller(s), a remote(s), a headset (e.g., sensors of a virtual reality headset, or head mounted display (HMD)), a microphone, and/or other types of input devices.

The communication interface 110 can include one or more components and features for communicating across one or more networks, such as the network(s) 102. The communication interface 110 can be configured to communicate via any number of network(s) 102, described herein. For example, to communicate in the game state transfer system 100 of FIG. 1, the client device 104 and the client device(s) 132 can use a cellular, Ethernet, or Wi-Fi connection through a router to access the Internet in order to communicate with the host server(s) 120 and/or the software distribution service 140.

Figure 2A:
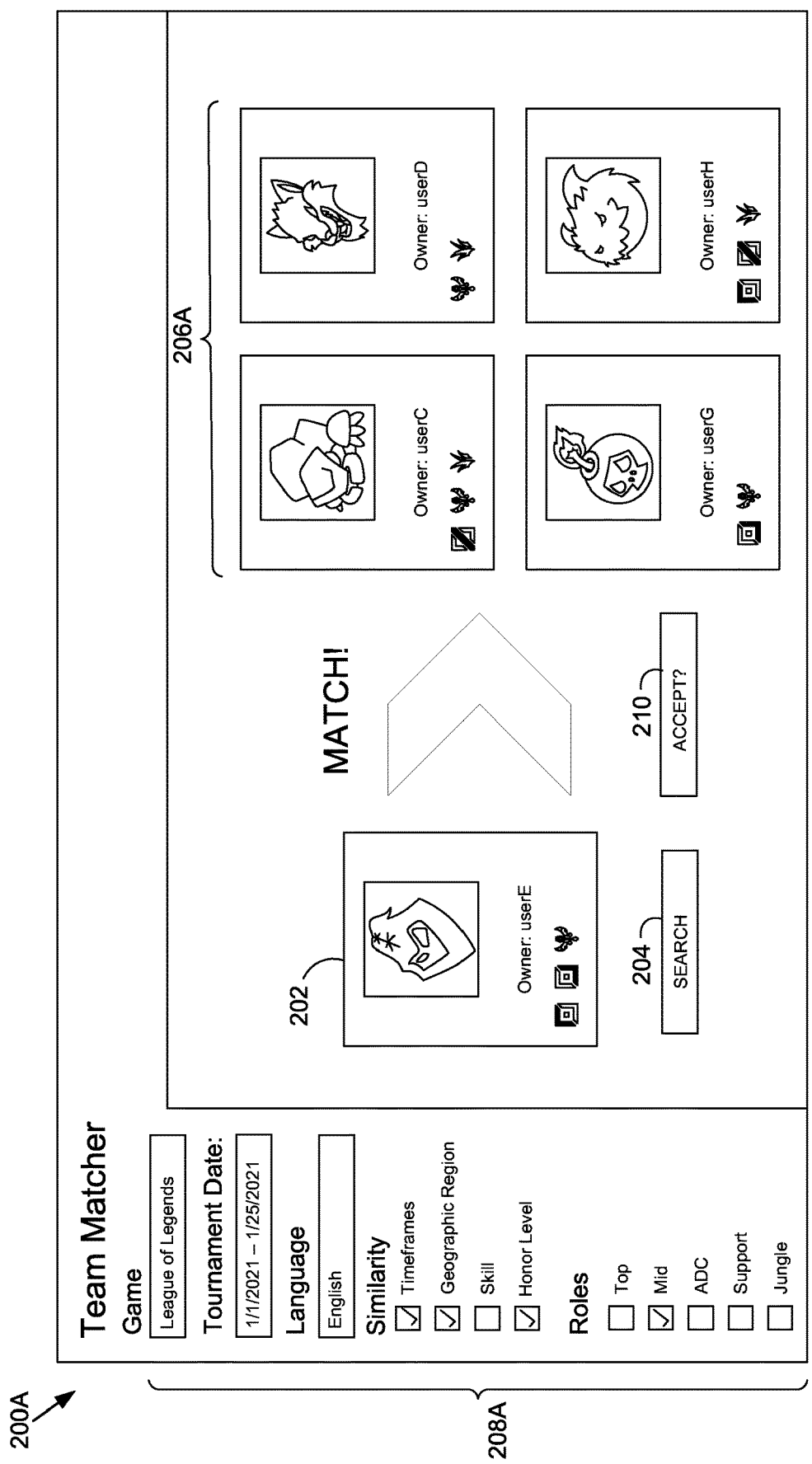

Now referring to FIG. 2A, FIG. 2A is an example team matcher 200A, in accordance with some embodiments of the present disclosure. The example team matcher 200A includes user profile card 202, search button 204, potential teammate profile cards 206A, selectable ranking attributes 208A and accept button 210.

In operation, a user associated with the user profile card 202 can access a UI for the team matcher 200A to search for user accounts to form a team. The user can then select one or more of the selectable ranking attributes 208A for ranking user accounts. For example, a user might be interested in generating a team for a League of Legends® Clash tournament during a set of scheduled dates with other user accounts that have one or more similar typical timeframes for gameplay, are located in a similar geographic region to the user, have a similar honor level, etc. Once the user has selected the desired selectable ranking attributes 208A, the user can press the search button 204 to generate a team from a set of user accounts based on the selected ranking attributes. The team matcher (e.g., using team matching component 128 of FIG. 1) can present the user with a set of potential teammate profile cards 206A. The user can then select and view each of the potential team profile cards to determine whether the user would like to form a team with the user accounts associated with the potential teammate profile cards 206A. If the user accepts the generated team, the user may select the accept button 210 to generate a team consisting of the user associated with the profile card 202 and the potential teammate profile cards 206A.

Figure 2B:
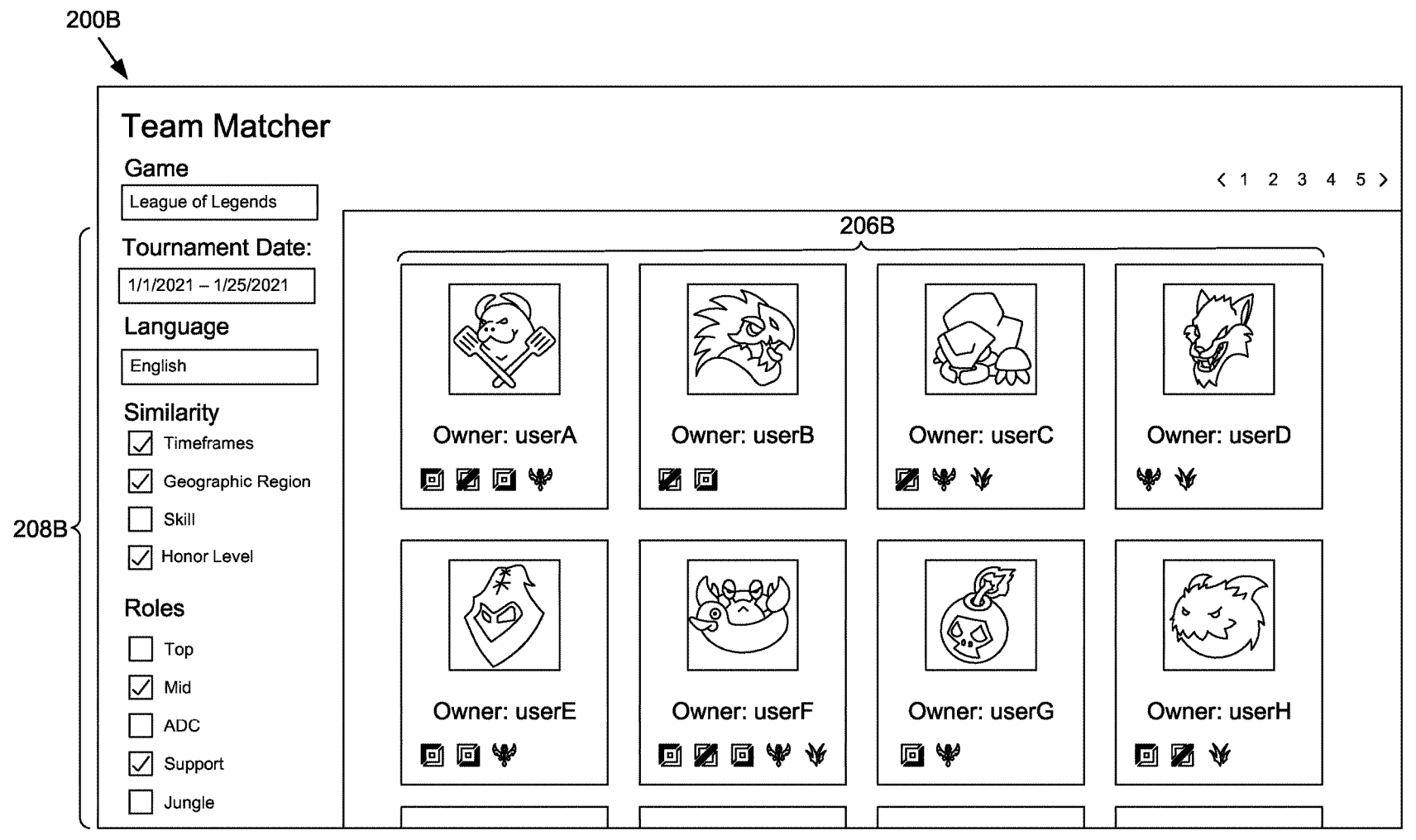

Turning to FIG. 2B, FIG. 2B is an example team matcher 200B, in accordance with some embodiments of the present disclosure. The example team matcher 200B includes potential teammate profile cards 206A and selectable ranking attributes 208A.

In operation, a user can access a UI for the team matcher 200B to search for user accounts to form a team. The user can then select one or more of the selectable ranking attributes 208B for ranking user accounts. For example, a user might be interested in generating a team for a League of Legends Clash tournament during a set of scheduled dates with other user accounts that have similar typical timeframes for gameplay, are located in a similar geographic region to the user, have a similar honor level, etc. As the user selects the desired selectable ranking attributes 208B the team matcher (e.g., using team matching component 128 of FIG. 1) can rank and present the user with a set of potential teammate profile cards 206B based on the selectable ranking attributes 208B and attributes of the user. The user can then select individual profile cards and view each of the potential team profile cards to determine whether the user would like to form a team with the user accounts associated with one or more of the potential teammate profile cards 206B. Using this piecemeal approach, the user can form a team of other user accounts (e.g., for a scheduled tournament date(s)) and invite the other user accounts to join the team.

Embodiments described herein can be applied to a mobile video game, such as League of Legends. However, this example video game is not intended to limit the scope of this patent. Rather, the inventors have contemplated that the claimed subject matter might also be embodied in other ways, to include different steps or combinations of steps similar to the ones described in this document.

Generally, League of Legends® is a multiplayer online battle arena (MOBA) game in a three dimensional isometric perspective. Opposing teams consisting of multiple players can compete in matches to achieve a victory condition (e.g., destroying a core building—called a "Nexus"—in a base of the opposing team after bypassing a series of defensive structures (e.g., "Turrets" or "Towers")).

League of Legends® can include, as part of its gameplay experience, a competitive team-based tournament system that rewards players for organized play called, "Clash." Teams for Clash can be organized by a captain who can decide on a team name, tag, and/or logo. Depending on individual rankings associated with user accounts that comprise the team, a team ranking (e.g., tier) can adjust to align similarly experienced teams to compete against each other. In Clash, matches (i.e., instances of gameplay) can be scheduled in advance and each member of a team can be required to verify their participation (e.g., lock in) prior to a starting time for the match. If a member of the team is unable to verify their participation, the team will not be able to participate in the Clash tournament. A clash tournament can have one or more matches. For example, a Clash tournament might consist of a bracket of eight teams with single elimination, resulting in three matches for winning teams.

In some instances of gameplay, users can control avatars called "Champions," which each have a set of abilities and/or attributes which can be stored in an object database in association with each Champion (e.g., in association with identity management component 124). Users can choose or can be assigned Champions before the start of each instance of gameplay (i.e., match, round, session, etc.). Each user Champion can begin an instance of gameplay at a low experience level, and can gain experience during the instance of gameplay to increase their experience level. Increased experience levels can allow users to unlock a Champion's unique set of abilities and/or attributes. In some embodiments, at the beginning of each instance of gameplay, each Champion can start with a health level of one hundred percent. If a Champion loses all their health, the champion can be defeated, but can be automatically revived at a base associated with the Champion after a given amount of time. In further embodiments, each user Champion can also begin each instance of gameplay with a low amount of gold, and in addition to being given gold by the game over time by default, users can earn gold throughout the instance of gameplay in a variety of ways, such as by eliminating non-player characters known as "Minions" and "Monsters," by eliminating or helping to eliminate enemy player Champions, by destroying enemy structures and through unique item interactions or Champion abilities. Gold can be spent throughout the instance of gameplay to buy in-game items that further augment each Champion's abilities and gameplay, such as increasing stats (e.g., health, ability power, spells, etc.) Further, champion experience, gold earned, and items bought can be specific to each instance of gameplay and might not carry over to a subsequent instance of gameplay.

In some embodiments, users can earn rewards throughout one or more instances of gameplay that can be applied to a user account associated with the user and stored in an IDM server. A user's account can begin at an entry level (e.g., one on a given level scale) and can progress upward as instances of the game are played. User account level can be separate from character and/or Champion level. For example, a user with a user account level 30 and a user with a user account level 5 can each begin an instance of a game at a character level 1.

User accounts can be given a ranking based on a ranking system (e.g., a Matchmaking Rating system (MMR) and/or an Elo rating system). A user ranking can be used to match user accounts of comparable skill level on each team in each instance of gameplay.

A "Tower" (e.g., also called a turret) can be a heavy fortification unit that can automatically attack enemy units if the enemy enters an attack zone of the tower. Towers can be an important unit of League of Legends. A tower can deal damage to enemy unites and provide vision to a user's team, allowing the team to better control a battlefield. Turrets can target one unit at a time and deal heavy damage. Opposing teams must destroy enemy towers to push their assault into enemy territory.

Figure 3:
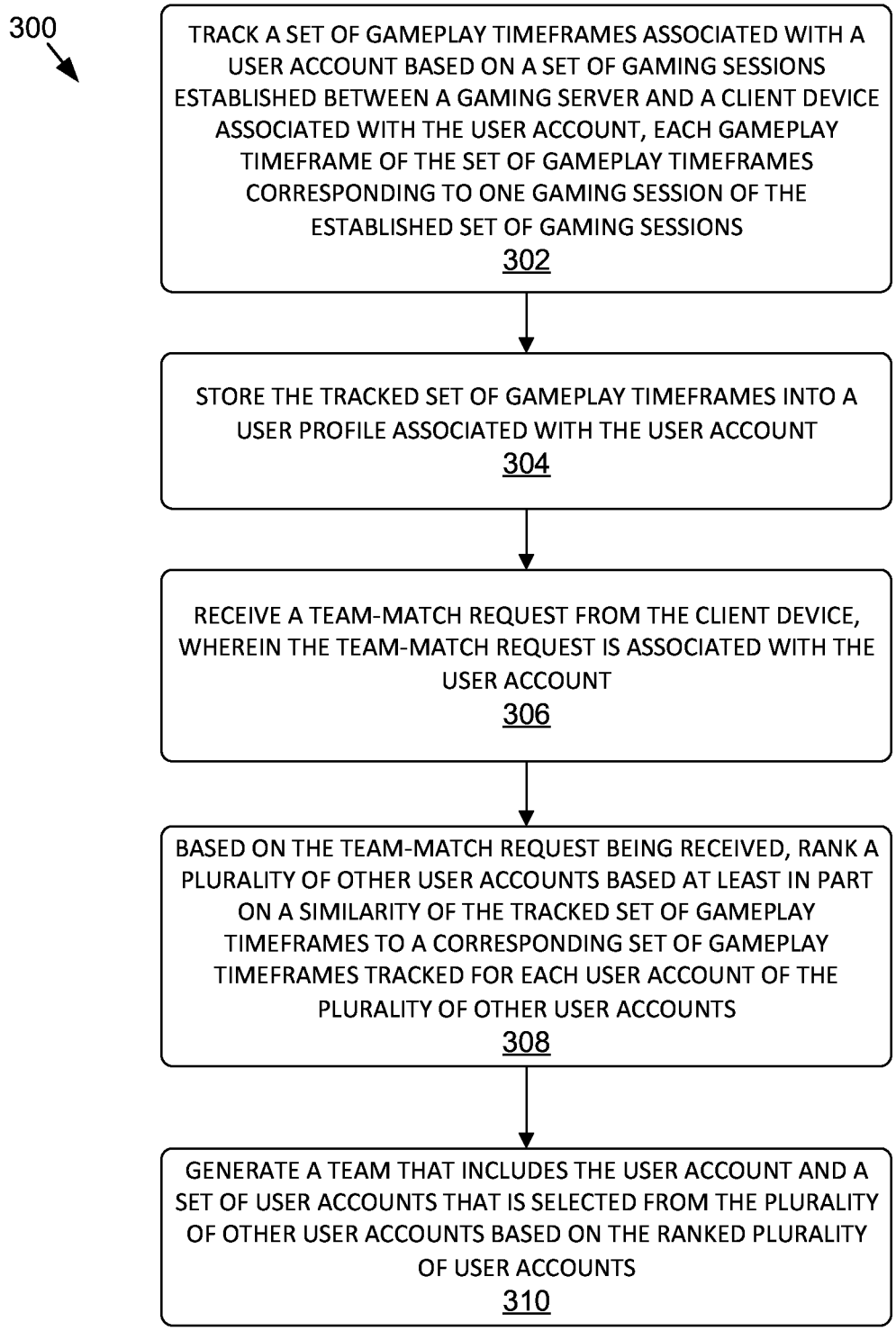
FIG. 3 is flow diagram for generating an online multiplayer team, in accordance with some embodiments of the present disclosure.

Now referring to FIG. 3, each block of method 300 described herein, comprises a computing process that can be performed using any combination of hardware, firmware, and/or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few. In addition, methods 300 is described, by way of example, with respect to the system of FIG. 1. However, these methods can additionally or alternatively be executed by any one system, or any combination of systems, including, but not limited to, those described herein.

FIG. 3 is a flow diagram showing a method 300 for generating a team that includes a user account and a set of other user accounts that is selected from the plurality of other user accounts based on a ranked plurality of user accounts, in accordance with some embodiments of the present disclosure. The method 300, at block 302, includes tracking a set of gameplay timeframes associated with a user account based on a set of gaming sessions established between a gaming server and a client device associated with the user account, each gameplay timeframe of the set of gameplay timeframes corresponding to one gaming session of the established set of gaming sessions. For example, the present system can track a set of timeframes for when a user is engaged in an instance of gameplay (i.e., gameplay timeframes), such as playing League of Legends®. In some embodiments, a user can be determined to be engaged in an instance of gameplay whenever the user interacts with a game. The user can be determined to interact with the game when a client device of the user is communicatively coupled to a server (e.g., host server, gaming server) associated with a game.

The method 300, at block 304 includes storing the tracked set of gameplay timeframes into a user profile associated with the user account. For example, a set of gameplay timeframes associated with a user account and/or user profile can be stored in an identity management system (IDM) that can be stored on host servers.

The method 300, at block 306 includes receiving a team-match request from the client device, wherein the team-match request is associated with the user account. For example, the user can request for their user account to be matched with other user accounts and/or to be presented with a list of the other user accounts who might be a good match for the user, such as those associated with one or more similar typical gameplay timeframes.

The method 300, at block 308 based on the team-match request being received, ranking a plurality of other user accounts based at least in part on a similarity of the tracked set of gameplay timeframes to a corresponding set of gameplay timeframes tracked for each user account of the plurality of other user accounts. For example, if a user who typically plays video games on Wednesday evenings requests to be matched, the system can access a set of user accounts available to be matched with the user and rank the set of user accounts based on the typical timeframe for gameplay associated with each of the user accounts in the set, ranking those who also play video games on Wednesday evenings higher than those who do not play on Wednesday evenings. In this example, user accounts that typically (e.g., more often than other days/times) play video games on Wednesday evenings might be given a high similarity ranking, those that occasionally play video games on Wednesday evenings might be given a medium similarity ranking (e.g., varying in granularity depending on frequency), and those that never play video games on Wednesday evenings might be given a low similarity ranking.

The method 300, at block 310 includes generating a team that includes the user account and a set of user accounts that is selected from the plurality of other user accounts based on the ranked plurality of user accounts. For example, a gameplay tournament may require five participants per team and, as such, the system can generate a team that includes the user that initiated a team generation request as well as four other user accounts that ranked highest based on selected attributes (e.g., highest degree of similarity of typical gameplay timeframe).

Although various examples are described herein with respect to video games and multiplayer online battle arena (MOBA) type games in particular, this is not intended to be limiting and can apply to various competitive and/or cooperative games, and eSports games that can include, without limitation, racing, sports simulation, real-time strategy, collectible card game simulations, massively multiplayer online games, platform games, etc.

Figure 4:
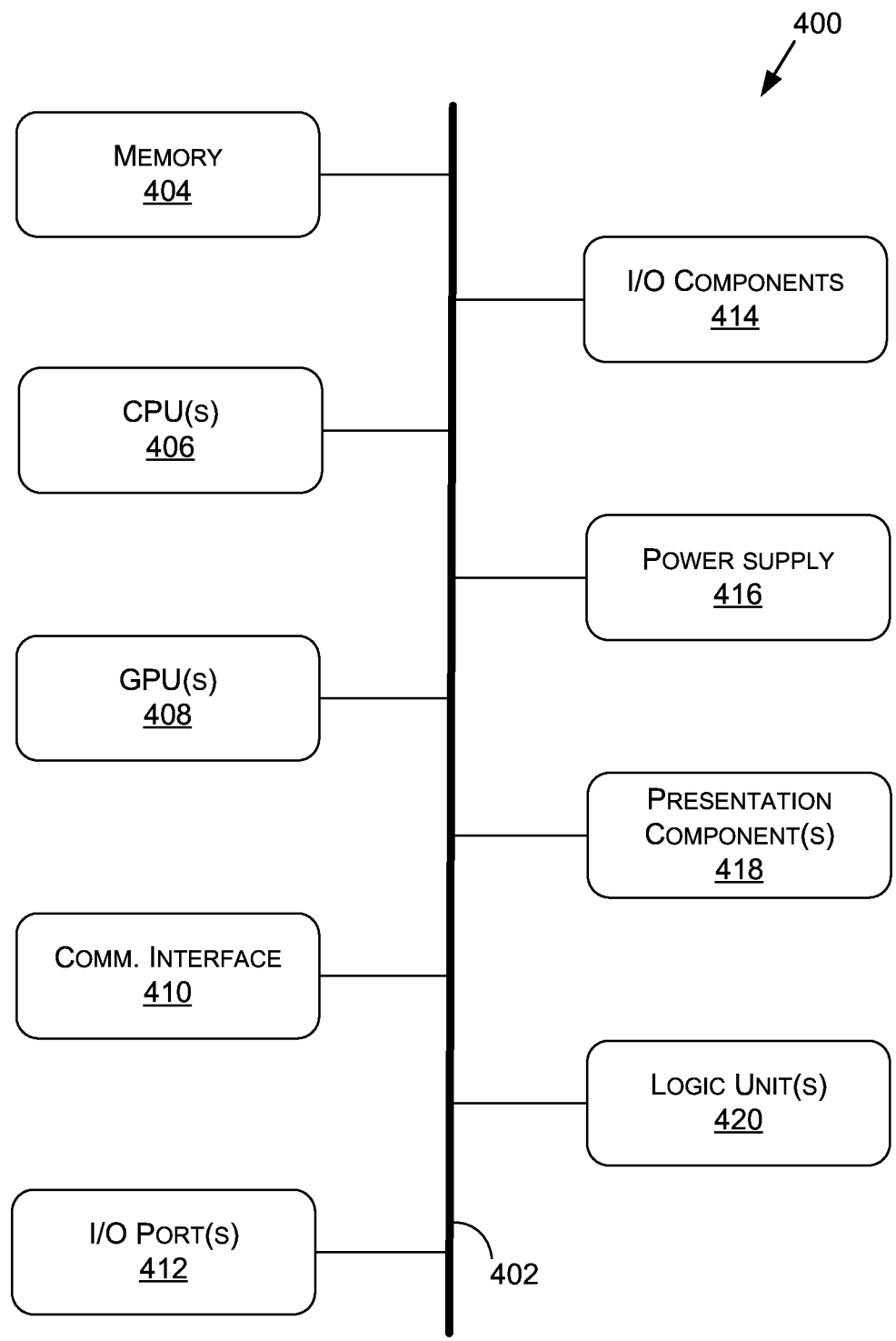
FIG. 4 is a block diagram of an example computing device suitable for use in implementing some embodiments of the present disclosure.

FIG. 4 is a block diagram of an example computing device(s) 400 suitable for use in implementing some embodiments of the present disclosure. Computing device 400 can include an interconnect system 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, one or more presentation components 418 (e.g., display(s)), and one or more logic units 420.

Although the various blocks of FIG. 4 are shown as connected via the interconnect system 402 with lines, this is not intended to be limiting and is for clarity only. For example, in some embodiments, a presentation component 418, such as a display device, can be considered an I/O component 414 (e.g., if the display is a touch screen). As another example, the CPUs 406 and/or GPUs 408 can include memory (e.g., the memory 404 can be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The interconnect system 402 can represent one or more links or busses, such as an address bus, a data bus, a control bus, or a combination thereof. The interconnect system 402 can include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 can be directly connected to the memory 404. Further, the CPU 406 can be directly connected to the GPU 408. Where there is direct, or point-to-point connection between components, the interconnect system 402 can include a PCIe link to carry out the connection. In these examples, a PCI bus need not be included in the computing device 400.

The memory 404 can include any of a variety of computer-readable media. The computer-readable media can be any available media that can be accessed by the computing device 400. The computer-readable media can include both volatile and nonvolatile media, and removable and non-removable media. By way of example, and not limitation, the computer-readable media can comprise computer-storage media and communication media.

The computer-storage media can include both volatile and nonvolatile media and/or removable and non-removable media implemented in any method or technology for storage of information such as computer-readable instructions, data structures, program modules, and/or other data types. For example, the memory 404 can store computer-readable instructions (e.g., that represent a program(s) and/or a program element(s), such as an operating system. Computer-storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. As used herein, computer storage media does not comprise signals per se.

The computer storage media can embody computer-readable instructions, data structures, program modules, and/or other data types in a modulated data signal such as a carrier wave or other transport mechanism and includes any information delivery media. The term "modulated data signal" can refer to a signal that has one or more of its characteristics set or changed in such a manner as to encode information in the signal. By way of example, and not limitation, the computer storage media can include wired media such as a wired network or direct-wired connection, and wireless media such as acoustic, RF, infrared and other wireless media. Combinations of any of the above should also be included within the scope of computer-readable media.

The CPU(s) 406 can be configured to execute at least some of the computer-readable instructions to control one or more components of the computing device 400 to perform one or more of the methods and/or processes described herein. The CPU(s) 406 can each include one or more cores (e.g., one, two, four, eight, twenty-eight, seventy-two, etc.) that are capable of handling a multitude of software threads simultaneously. The CPU(s) 406 can include any type of processor, and can include different types of processors depending on the type of computing device 400 implemented (e.g., processors with fewer cores for mobile devices and processors with more cores for servers). For example, depending on the type of computing device 400, the processor can be an Advanced RISC Machines (ARM) processor implemented using Reduced Instruction Set Computing (RISC) or an x86 processor implemented using Complex Instruction Set Computing (CISC). The computing device 400 can include one or more CPUs 406 in addition to one or more microprocessors or supplementary co-processors, such as math co-processors.

In addition to or alternatively from the CPU(s) 406, the GPU(s) 408 can be configured to execute at least some of the computer-readable instructions to control one or more components of the computing device 400 to perform one or more of the methods and/or processes described herein. One or more of the GPU(s) 408 can be an integrated GPU (e.g., with one or more of the CPU(s) 406 and/or one or more of the GPU(s) 408 can be a discrete GPU. In embodiments, one or more of the GPU(s) 408 can be a coprocessor of one or more of the CPU(s) 406. The GPU(s) 408 can be used by the computing device 400 to render graphics (e.g., 3D graphics) or perform general purpose computations. For example, the GPU(s) 408 can be used for General-Purpose computing on GPUs (GPGPU). The GPU(s) 408 can include hundreds or thousands of cores that are capable of handling hundreds or thousands of software threads simultaneously. The GPU(s) 408 can generate pixel data for output images in response to rendering commands (e.g., rendering commands from the CPU(s) 406 received via a host interface). The GPU(s) 408 can include graphics memory, such as display memory, for storing pixel data or any other suitable data, such as GPGPU data. The display memory can be included as part of the memory 404. The GPU(s) 408 can include two or more GPUs operating in parallel (e.g., via a link). The link can directly connect the GPUs or can connect the GPUs through a switch. When combined together, each GPU 408 can generate pixel data or GPGPU data for different portions of an output or for different outputs (e.g., a first GPU for a first image and a second GPU for a second image). Each GPU can include its own memory, or can share memory with other GPUs.

In addition to or alternatively from the CPU(s) 406 and/or the GPU(s) 408, the logic unit(s) 420 can be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 can discretely or jointly perform any combination of the methods, processes and/or portions thereof. One or more of the logic units 420 can be part of and/or integrated in one or more of the CPU(s) 406 and/or the GPU(s) 408 and/or one or more of the logic units 420 can be discrete components or otherwise external to the CPU(s) 406 and/or the GPU(s) 408. In embodiments, one or more of the logic units 420 can be a coprocessor of one or more of the CPU(s) 406 and/or one or more of the GPU(s) 408.

Examples of the logic unit(s) 420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 410 can include one or more receivers, transmitters, and/or transceivers that enable the computing device 400 to communicate with other computing devices via an electronic communication network, included wired and/or wireless communications. The communication interface 410 can include components and functionality to enable communication over any of a number of different networks, such as wireless networks (e.g., Wi-Fi, Z-Wave, Bluetooth, Bluetooth LE, ZigBee, Ultra-Wideband (UWB), etc.), wired networks (e.g., communicating over Ethernet or InfiniBand), low-power wide-area networks (e.g., LoRaWAN, SigFox, etc.), and/or the Internet.

The I/O ports 412 can enable the computing device 400 to be logically coupled to other devices including the I/O components 414, the presentation component(s) 418, and/or other components, some of which can be built in to (e.g., integrated in) the computing device 400. Illustrative I/O components 414 include a microphone, mouse, keyboard, joystick, game pad, game controller, satellite dish, scanner, printer, wireless device, etc. The I/O components 414 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 can be include depth cameras, such as stereoscopic camera systems, infrared camera systems, RGB camera systems, touchscreen technology, and combinations of these, for gesture detection and recognition. Additionally, the computing device 400 can include accelerometers or gyroscopes (e.g., as part of an inertia measurement unit (IMU)) that enable detection of motion. In some examples, the output of the accelerometers or gyroscopes can be used by the computing device 400 to render immersive augmented reality or virtual reality.

The power supply 416 can include a hard-wired power supply, a battery power supply, or a combination thereof. The power supply 416 can provide power to the computing device 400 to enable the components of the computing device 400 to operate.

The presentation component(s) 418 can include a display (e.g., a monitor, a touch screen, a television screen, a heads-up-display (HUD), other display types, or a combination thereof), speakers, and/or other presentation components. The presentation component(s) 418 can receive data from other components (e.g., the GPU(s) 408, the CPU(s) 406, etc.), and output the data (e.g., as an image, video, sound, etc.).

Network environments suitable for use in implementing embodiments of the disclosure can include one or more client devices, servers, network attached storage (NAS), other backend devices, and/or other device types. The client devices, servers, and/or other device types (e.g., each device) can be implemented on one or more instances of the computing device(s) 400 of FIG. 4—e.g., each device can include similar components, features, and/or functionality of the computing device(s) 400.

Components of a network environment can communicate with each other via a network(s), which can be wired, wireless, or both. The network can include multiple networks, or a network of networks. By way of example, the network can include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) can provide wireless connectivity.

Compatible network environments can include one or more peer-to-peer network environments—in which case a server might not be included in a network environment—and one or more client-server network environments—in which case one or more servers can be included in a network environment. In peer-to-peer network environments, functionality described herein with respect to a server(s) can be implemented on any number of client devices.

In at least one embodiment, a network environment can include one or more cloud-based network environments, a distributed computing environment, a combination thereof, etc. A cloud-based network environment can include a framework layer, a job scheduler, a resource manager, and a distributed file system implemented on one or more of servers, which can include one or more core network servers and/or edge servers. A framework layer can include a framework to support software of a software layer and/or one or more application(s) of an application layer. The software or application(s) can respectively include web-based service software or applications. In embodiments, one or more of the client devices can use the web-based service software or applications (e.g., by accessing the service software and/or applications via one or more application programming interfaces (APIs)). The framework layer can be, but is not limited to, a type of free and open-source software web application framework such as that can use a distributed file system for large-scale data processing (e.g., "big data").

A cloud-based network environment can provide cloud computing and/or cloud storage that carries out any combination of computing and/or data storage functions described herein (or one or more portions thereof). Any of these various functions can be distributed over multiple locations from central or core servers (e.g., of one or more data centers that can be distributed across a state, a region, a country, the globe, etc.). If a connection to a user (e.g., a client device) is relatively close to an edge server(s), a core server(s) can designate at least a portion of the functionality to the edge server(s). A cloud-based network environment can be private (e.g., limited to a single organization), can be public (e.g., available to many organizations), and/or a combination thereof (e.g., a hybrid cloud environment).

The client device(s) can include at least some of the components, features, and functionality of the example computing device(s) 400 described herein with respect to FIG. 4. By way of example and not limitation, a client device can be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure can be practiced in a variety of system configurations, including hand-held devices, consumer electronics, general-purpose computers, more specialty computing devices, etc. The disclosure can also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" can include only element A, only element B, only element C, element A and element B, element A and element C, element B and element C, or elements A, B, and C. In addition, "at least one of element A or element B" can include at least one of element A, at least one of element B, or at least one of element A and at least one of element B. Further, "at least one of element A and element B" can include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by one or more computing devices, cause the one or more computing devices to perform operations comprising:
    tracking a set of gameplay timeframes associated with a user account based on a set of gaming sessions established between a gaming server and a client device associated with the user account, each gameplay timeframe of the set of gameplay timeframes corresponding to one gaming session of the established set of gaming sessions;
    storing the tracked set of gameplay timeframes into a user profile associated with the user account;
    receiving a team-match request and a selection of one or more ranking attributes from the client device, wherein the team-match request is associated with the user account;
    based on the team-match request being received, ranking a plurality of other user accounts based at least in part on a similarity of the tracked set of gameplay timeframes to a corresponding set of gameplay timeframes tracked for each user account of the plurality of other user accounts and the selected one or more ranking attributes; and
    generating a team that includes the user account and a set of user accounts that is selected from the plurality of other user accounts based on the ranked plurality of user accounts.

2. The medium of claim 1, wherein each gameplay timeframe of the set of gameplay timeframes is associated with a corresponding date and a corresponding time period of one of the established set of gaming sessions.

3. The medium of claim 1, wherein each gaming session of the established set of gaming sessions is a free-play gaming session.

4. The medium of claim 3, wherein the team-match request includes a request to form the team in association with a set of tournament-play gaming sessions.

5. The medium of claim 3, the operations further comprising:
    scheduling the set of tournament-play gaming sessions for the team based on at least a portion of the set of gameplay timeframes and at least a portion of the corresponding set of gameplay timeframes tracked for each user account of the plurality of user accounts.

6. The medium of claim 1,
    wherein each gameplay timeframe of the set of gameplay timeframes is associated with a free-play mode of the gaming server, and
    wherein the team-match request is received in association with a tournament-play mode of the gaming server.

7. The medium of claim 1, further comprising:
    based on the teach-match request being received, ranking the plurality of other user accounts based at least in part on a comparison of a first geographical region associated with the user account to a plurality of geographical regions associated with each of the plurality of other user accounts, wherein a similarity between the first geographical region associated with the user account and a second geographical region associated with a second user account of the plurality of other user accounts improves a ranking associated with the second user account.

8. The medium of claim 1, further comprising:
    determining the user account and another user account won a previous instance of gameplay while operating as teammates; and
    based on the determining, assigning a higher rank to the other user account.

9. A method comprising:
    tracking a set of gameplay timeframes associated with a user account based on a set of gaming sessions established between a gaming server and a client device associated with the user account, each gameplay timeframe of the set of gameplay timeframes corresponding to one gaming session of the established set of gaming sessions;
    storing the tracked set of gameplay timeframes into a user profile associated with the user account;
    receiving a team-match request and a selection of one or more ranking attributes from the client device, wherein the team-match request is associated with the user account;
    based on the team-match request being received, ranking a plurality of other user accounts based at least in part on a similarity of the tracked set of gameplay timeframes to a corresponding set of gameplay timeframes tracked for each user account of the plurality of other user accounts and the selected one or more ranking attributes; and
    generating a team that includes the user account and a set of user accounts that is selected from the plurality of other user accounts based on the ranked plurality of user accounts.

10. The method of claim 9, wherein each gameplay timeframe of the set of gameplay timeframes is associated with a corresponding date and a corresponding time period of one of the established set of gaming sessions.

11. The method of claim 9, wherein each gaming session of the established set of gaming sessions is a free-play gaming session.

12. The method of claim 9, wherein the team-match request includes a request to form the team in association with a set of tournament-play gaming sessions.

13. The method of claim 8, the operations further comprising:
scheduling the set of tournament-play gaming sessions for the team based on at least a portion of the set of gameplay timeframes and at least a portion of the corresponding set of gameplay timeframes tracked for each user account of the plurality of user accounts.

14. The method of claim 9,
wherein each gameplay timeframe of the set of gameplay timeframes is associated with a free-play mode of the gaming server, and
wherein the team-match request is received in association with a tournament-play mode of the gaming server.

15. The method of claim 9, further comprising:
based on the team-match request being received, ranking the plurality of other user accounts based at least in part on a comparison of a first geographical region associated with the user account to a plurality of geographical regions associated with each of the plurality of other user accounts, wherein a similarity between the first geographical region associated with the user account and a second geographical region associated with a second user account of the plurality of other user accounts improves a ranking associated with the second user account.

16. The method of claim 9, further comprising:
determining the user account and another user account won a previous instance of gameplay while operating as teammates; and
based on the determining, assigning a higher rank to the other user account.

17. A system comprising:
at least one processor, and
at least one storage medium storing computer-usable instructions that, when used by the at least one processor, cause the at least one processor to perform operations comprising:
tracking a set of gameplay timeframes associated with a user account based on a set of gaming sessions established between a gaming server and a client device associated with the user account, each gameplay timeframe of the set of gameplay timeframes corresponding to one gaming session of the established set of gaming sessions;
storing the tracked set of gameplay timeframes into a user profile associated with the user account;
receiving a team-match request and a selection of one or more ranking attributes from the client device, wherein the team-match request is associated with the user account;
based on the team-match request being received, ranking a plurality of other user accounts based at least in part on a similarity of the tracked set of gameplay timeframes to a corresponding set of gameplay timeframes tracked for each user account of the plurality of other user accounts and the selected one or more ranking attributes; and
generating a team that includes the user account and a set of user accounts that is selected from the plurality of other user accounts based on the ranked plurality of user accounts.

18. The system of claim 17, wherein each gameplay timeframe of the set of gameplay timeframes is associated with a corresponding date and a corresponding time period of one of the established set of gaming sessions.

19. The system of claim 17, wherein each gaming session of the established set of gaming sessions is a free-play gaming session.

20. The system of claim 17, wherein the team-match request includes a request to form the team in association with a set of tournament-play gaming sessions.

* * * * *